(12) United States Patent
Yeung et al.

(10) Patent No.: US 11,155,171 B2
(45) Date of Patent: Oct. 26, 2021

(54) MOBILE ELECTRICITY-GENERATOR SYSTEM ON VEHICLES

(71) Applicant: Benjamin Yeung, Monrovia, CA (US)

(72) Inventors: Yung Yeung, Bradbury, CA (US); Bo Ruan, Pasadena, CA (US); Junhua Chen, Pasadena, CA (US); Robert McKeirnan, Pasadena, CA (US); Junwen Hou, Pasadena, CA (US); Artur Bagumyan, Pasadena, CA (US)

( * ) Notice: Subject to any disclaimer, the term of this patent is extended or adjusted under 35 U.S.C. 154(b) by 272 days.

(21) Appl. No.: 16/358,958

(22) Filed: Mar. 20, 2019

(65) Prior Publication Data

US 2019/0291590 A1    Sep. 26, 2019

Related U.S. Application Data

(60) Provisional application No. 62/645,555, filed on Mar. 20, 2018, provisional application No. 62/645,516, (Continued)

(51) Int. Cl.
*B60L 15/20* (2006.01)
*B60L 50/13* (2019.01)
(Continued)

(52) U.S. Cl.
CPC ............... *B60L 15/20* (2013.01); *B60L 50/12* (2019.02); *B60L 50/13* (2019.02); *B60L 50/51* (2019.02);
(Continued)

(58) Field of Classification Search
CPC .......... B60L 15/20; B60L 50/13; B60L 50/12; B60L 50/61; B60L 50/51; B60L 50/52;

F01D 15/10; F01D 15/02; F02C 3/04; F02C 7/10; F02C 7/08; F02C 3/085; B60Y 2200/91; F05D 2220/32; F05D 2220/764;

(Continued)

(56) References Cited

U.S. PATENT DOCUMENTS 5,265,435 A * 11/1993 Richardson .......... B60H 1/3222
62/133
6,380,637 B1 * 4/2002 Hsu ........................ B60L 1/006
290/1 R
(Continued)

FOREIGN PATENT DOCUMENTS

DE    102015217937 A1 *  9/2016   ............... B60K 6/30

*Primary Examiner* — Jonathan M Dager
*Assistant Examiner* — Jean W Charleston
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a vehicle power system, which includes an electric motor, a primary power source that energizes the electric motor, wherein the primary power source employs a turbine to generate electricity, a second power source that supplements the primary power source to energize the electric motor, and a control component that monitors power provided to the electric motor by the primary power source, that determines that additional power needs to be provided to the electric motor in order to meet a driving requirement, and that directs additional power from the second power source to the electric motor.

5 Claims, 7 Drawing Sheets

Related U.S. Application Data filed on Mar. 20, 2018, provisional application No. 62/645,614, filed on Mar. 20, 2018, provisional application No. 62/645,643, filed on Mar. 20, 2018.

(51) Int. Cl.

| | |
|---|---|
| *B60L 50/12* | (2019.01) |
| *B60L 50/61* | (2019.01) |
| *B60L 50/51* | (2019.01) |
| *F01D 15/10* | (2006.01) |
| *F02C 3/04* | (2006.01) |
| *F02C 7/10* | (2006.01) |
| *B60L 50/52* | (2019.01) |

(52) U.S. Cl.
CPC ............... *B60L 50/52* (2019.02); *B60L 50/61* (2019.02); *F01D 15/10* (2013.01); *F02C 3/04* (2013.01); *F02C 7/10* (2013.01); *B60Y 2200/91* (2013.01); *F05D 2220/32* (2013.01); *F05D 2220/764* (2013.01)

(58) Field of Classification Search
CPC ........... F05D 2250/82; F05D 2220/768; Y02T 10/7072; Y02T 10/70; Y02T 10/62; Y02T 10/72; Y02T 50/60
USPC .......................................................... 701/22
See application file for complete search history.

(56) References Cited

U.S. PATENT DOCUMENTS

| | | | |
|---|---|---|---|
| 6,396,165 B1 * | 5/2002 | Nagano | F02N 11/04 307/10.6 |
| 8,727,271 B2 * | 5/2014 | Salyer | B64C 27/14 244/60 |
| 2010/0273606 A1 * | 10/2010 | Roses | B60W 10/026 477/62 |
| 2016/0257192 A1 * | 9/2016 | Cesaroni | B60K 6/543 |
| 2018/0201253 A1 * | 7/2018 | Fujita | B60W 20/40 |
| 2019/0023114 A1 * | 1/2019 | Nguyen Huu | B60K 6/24 |

* cited by examiner

MOBILE ELECTRICITY-GENERATOR SYSTEM ON VEHICLES

CROSS-REFERENCE TO RELATED APPLICATION(S)

This application claims the benefits of U.S. Provisional Application Ser. No. 62/645,555, entitled "DISTRIBUTED, MOBILE ELECTRICITY-GENERATOR SYSTEM UTILIZING ELECTRIC VEHICLES" and filed on Mar. 20, 2018, U.S. Provisional Application Ser. No. 62/645,516, entitled "MICRO TURBINE AS A PRIMARY POWER FOR HYBRID ELECTRIC VEHICLE" and filed on Mar. 20, 2018, U.S. Provisional Application Ser. No. 62/645,614, entitled "MICRO GAS TURBINE VEHICLE RANGE EXTENDER" and filed on Mar. 20, 2018, and U.S. Provisional Application Ser. No. 62/645,643, entitled "ACTIVE CONTROLS OF MICRO TURBINE FOR OPTIMAL PERFORMANCE" and filed on Mar. 20, 2018, all of which are expressly incorporated by reference herein in their entirety.

BACKGROUND

Field

The present disclosure relates to mobile electricity-generator system on vehicles.

Background

The statements in this section merely provide background information related to the present disclosure and may not constitute prior art.

An Electric Range Extended Vehicle (EREV) is a type of vehicle that combines an internal micro turbine generator system combined with a battery pack and an electric propulsion system (e.g., an electric vehicle drivetrain). Electric Vehicles (EVs) use electric energy stored in battery packs to power the automobile. Nonetheless, EVs have travel range, maintenance, and life duration constraints. Therefore, there is an alternate approach by integrating a micro turbine generator system into EVs thus augmenting an EV into an Electric Range Extended Vehicle (EREV).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure relates to a vehicle system having an engine. The engine includes a micro turbine generator configured to convert an output power from the micro turbine generator to a first alternative current power (AC), a fuel system connected to the engine and providing fuel or gaseous supply to the engine, and a rectifier connected to an outlet of the generator and configured to rectify the first AC power to a direct current (DC) power.

The system further includes an inverter connected to an outlet of the rectifier and configured to transform the DC power to a second AC power that can be subsequently applied to an electric motor of the EREV, a battery connected to the outlet of the rectifier, disposed between the rectifier and the inverter and being chargeable by an output of the rectifier, and a vehicle control module that controls the system to provide the second AC power from the micro turbine and/or the battery as power sources through the inverter for the electric motor of the hybrid vehicle.

Further, the EREV has an on-board battery for energy storage and an on-board micro turbine for power generation. The battery and micro turbine operate as an integrated system and can also provide vehicle to grid power. Certain implementations provide vehicle to grid power application via micro turbine range extender technology with low emission. Certain implementations can provide vehicle to vehicle grid network to support local high energy demand or during natural disaster. Certain implementations can provide local power demand in off-grid and rural area without easy access to local utility. Certain implementations can provide alternative clean power source based on local fuel availability due to system's fuel flexibility with a micro turbine generator.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings illustrate one or more configurations of the present disclosure and together with the written description, serve to explain the principles of the present disclosure. Wherever possible, the same reference numbers are used throughout the drawings to refer to the same or like elements of a configuration.

DETAILED DESCRIPTION OF THE PRESENT DISCLOSURE

Figure 1:
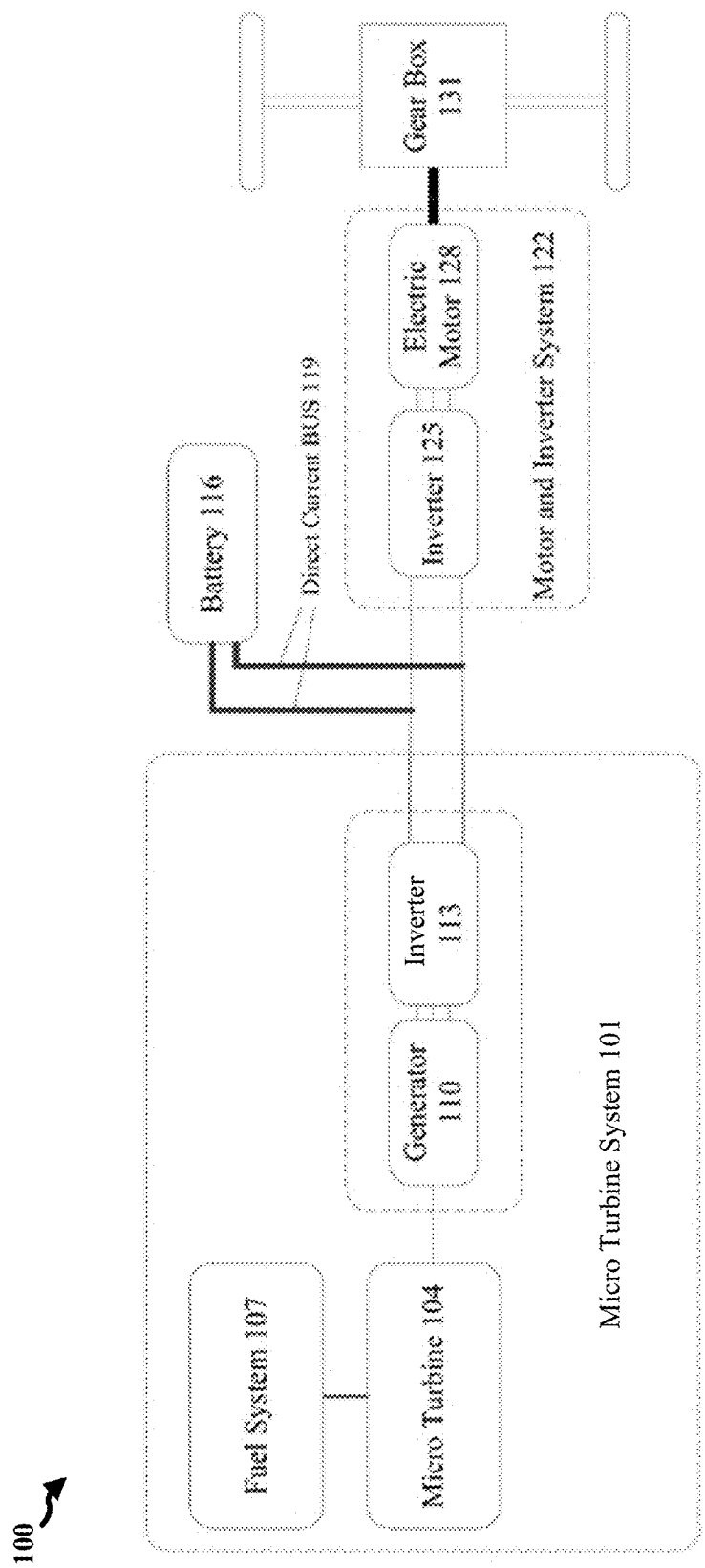
FIG. 1 is a schematic diagram 100 illustrating a power system of a hybrid electric vehicle (HEV).

The present disclosure is more particularly described in the following examples that are intended as illustrative only since numerous modifications and variations therein will be apparent to those skilled in the art. Various configurations of the present disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

Certain aspects of the present disclosure relate to computer control systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Micro turbines evolved from automotive and truck turbochargers, auxiliary power units for airplanes and small jet engines. Micro turbines offer a number of potential advantages compared to other technologies for small-scale power generation. These advantages include fewer number of moving parts, compact size, light-weight, greater efficiency, lower emissions, lower electricity costs and opportunities to utilize waste fuels. Micro turbines have the potential to be located on sites with space limitations for production of power. Waste heat recovery can be used with these systems to achieve efficiencies greater than 80 percent.

Micro turbines can also be classified as simple cycle or recuperated. In a simple cycle, or unrecuperated, turbine, compressed air is mixed with fuel and burned under constant pressure conditions. The resulting hot gas is allowed to expand through a turbine wheel to perform work. Simple cycle micro turbines may have lower costs and more heat available for cogeneration applications than recuperated units. Recuperated units use a sheet-metal heat exchanger that recovers heat from an exhaust stream and transfer it to the incoming compressed air stream. The preheated compressed air is then used in the combustion process. If the air is preheated, less fuel is necessary to raise its temperature to the required level at the turbine inlet. Recuperated units have an overall higher thermal efficiency than unrecuperated units and, in addition, can produce 30-40 percent fuel savings. Advanced materials, such as ceramics, high temperature alloys, and thermal barrier coatings, are some of the key enabling technologies to further improve micro turbines efficiency gains which allow for significant increase in engine operating temperatures.

FIG. 1 is a schematic diagram illustrating a power system of an EREV. A power system 100 includes a micro turbine system 101, a motor and inverter system 122 with an inlet connected to micro turbine system 101 and an outlet connected to a gear box 131 of the hybrid vehicle, and a battery 116 disposed between micro turbine system 101 and motor and inverter system 122.

The micro turbine system 101 includes a micro turbine 104, a generator 110 connected to micro turbine 104 and converting an output mechanical energy from micro turbine 104 to a first AC power, a fuel system 107 providing fuel or gaseous supply to the micro turbine 104, and a inverter 113 connected to an outlet of generator 110 and rectifying the first AC power to a DC power. Also, this inverter 113 will be used to converter DC power to AC power for motoring or starting the micro turbine.

Figure 3:
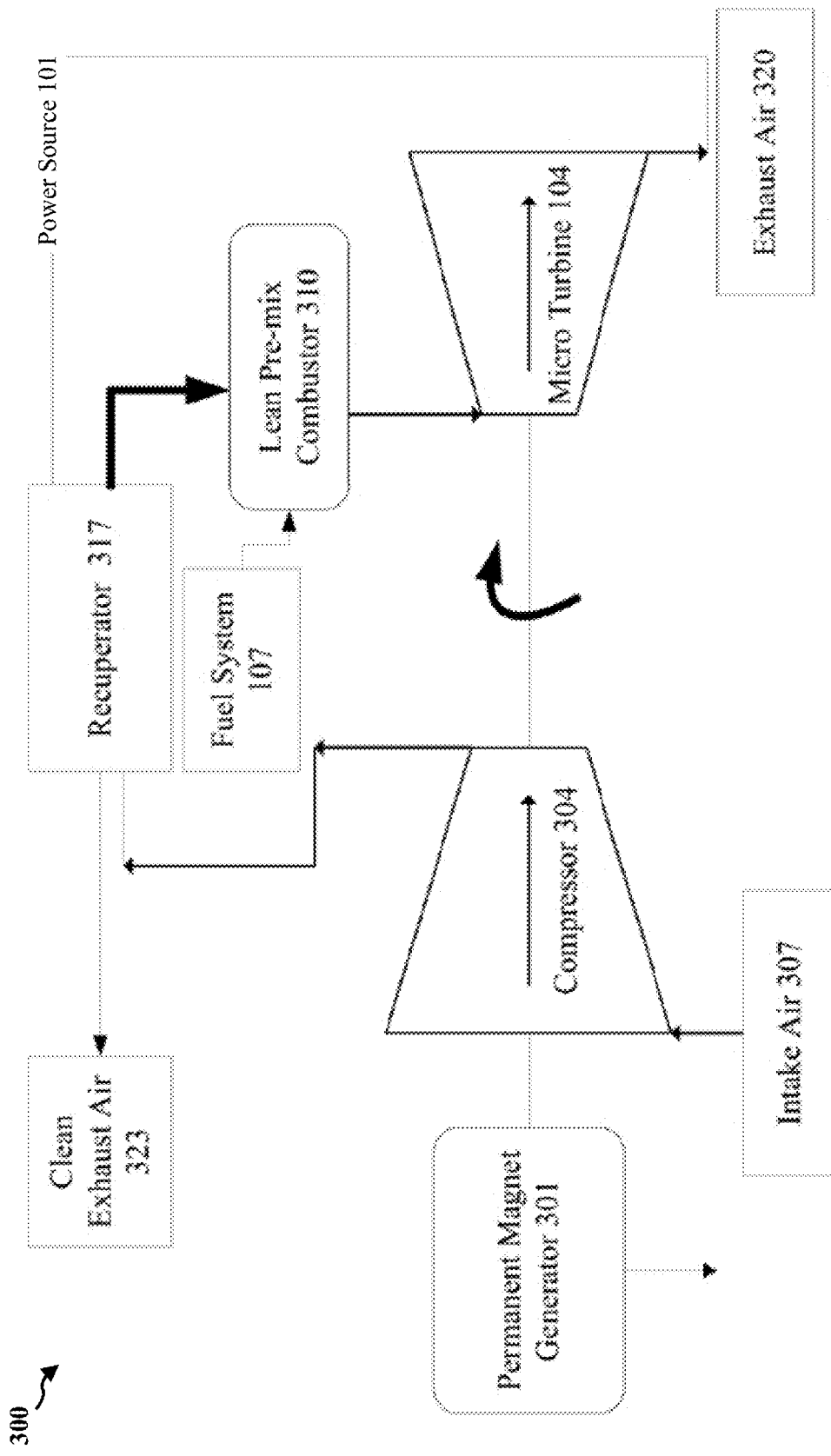
FIG. 3 is a schematic diagram 300 of the engine of FIG. 1.

The micro turbine system 101 and generator 110 are further described in FIG. 3 of the present disclosure.

Fuel system 107 may supply compressed natural gas (CNG), diesel, gasoline, hydrogen, or other types of fuel to the micro turbine system 101 based upon the EREV fuel tank configuration. For example, the fuel system 107 may include a fuel tank (not shown) such as a gasoline tank, propane tank, gas tank, etc. to store fuel, hydrocarbon fuel, hydrogen, etc., which is supplied to micro turbine 104 under control of a fuel control module 213 (shown in FIG. 2). Micro turbine 104 may be compatible with high pressure natural gas, diesel fuels, high-pressure gaseous propane, hydrogen, unleaded gasoline, ethanol, methanol, ethane, methane, etc. Inverter 113 is an electrical device that converts AC to DC or DC to AC power. In one configuration, Inverter 113 rectifies the AC power from generator 110 to the DC power that can charge battery 116 and provide power to the Motor and Inverter System 122. Inverter 113 may be operated to transform the AC power to the DC power to provide power to the DC Bus 119, or DC to AC power to motor the micro turbine 104.

Battery 116 is connected to the outlet of inverter 113 through a DC bus 119 and is chargeable by an output of inverter 113. Battery 116 is disposed between inverter 113 and an inverter 125. Both inverter 113 and inverter 125 are bi-directional power controllers, which convert DC to AC or AC to DC power (Shown in FIG. 1 and FIG. 2). For the power system 100, the AC power from micro turbine 104 of micro turbine system 101 is the primary source for recharging the battery and supplemental power to the electric motor 128, Specifically, the electricity for electric motor 128 is directly from battery 116 which may provide 100 percent, 95 percent, 90 percent, 85 percent, 80 percent, 75 percent, etc. of the power needed to drive electric motor 128, while generator 110 connected to micro turbine 104, inverter 113 and inverter 125 provides the remaining power required by electric motor for a full operation of the EREV. In one configuration, the electricity from generator 110 may provide more than 50 percent of the power needed to drive electric motor 128, or any percentage of the power needed from more than 50 percent to 100 percent. Battery 116 may provide the remaining power through inverter 125 to electric motor 128 so that electric motor has 100 percent of the power needed to drive electric motor 128. Operations of the EREV, including descriptions of the power adjustment for the EREV are described in FIG. 7. Micro Turbine System 101 may also provide local power source for electric motor 128 when an operation such as acceleration is performed. Further, when electric motor 128 is operated at a low speed, there is a reduced need for electrical power required to service electric motor 128, and then battery 116 may be used to store additional energy produced during the time of reduced load from micro turbine 104. Battery 116 may be a single battery or multiple batteries.

Motor and inverter system 122 includes inverter 125 and electric motor 128 connected to an outlet of inverter 125.

Inverter 125 is an electrical device that converts electricity derived from a DC source to an AC source that can be used to drive an AC appliance. Inverter 125 is connected to the outlet of inverter 113 and is used to convert the regulated voltage from inverter 113 to an operating voltage for driving electric motor 128. In one configuration, inverter 125 transforms the DC power to the AC power, and the AC power is subsequently applied to electric motor 128 of the hybrid vehicle. Inverter 125 may output power at a variety of voltages for different load requirements of electric motor 128. For example, when the EREV is on a traffic road according to signals of a GPS device, electric motor 128 may be provided with a lower power for operations of the EREV. In another configuration, when the EREV has more passengers, electric motor 128 may be provided with a higher power for operations of the EREV.

Electric motor 128 is an electrical machine that converts electrical energy into mechanical energy and is connected with, and drivable by, the power from inverter 125. A motor drive shaft extends from electric motor 128 and is in mechanical connection with gear box 131. Electric motor 128 may be used to rotate gear box 131.

Figure 2:
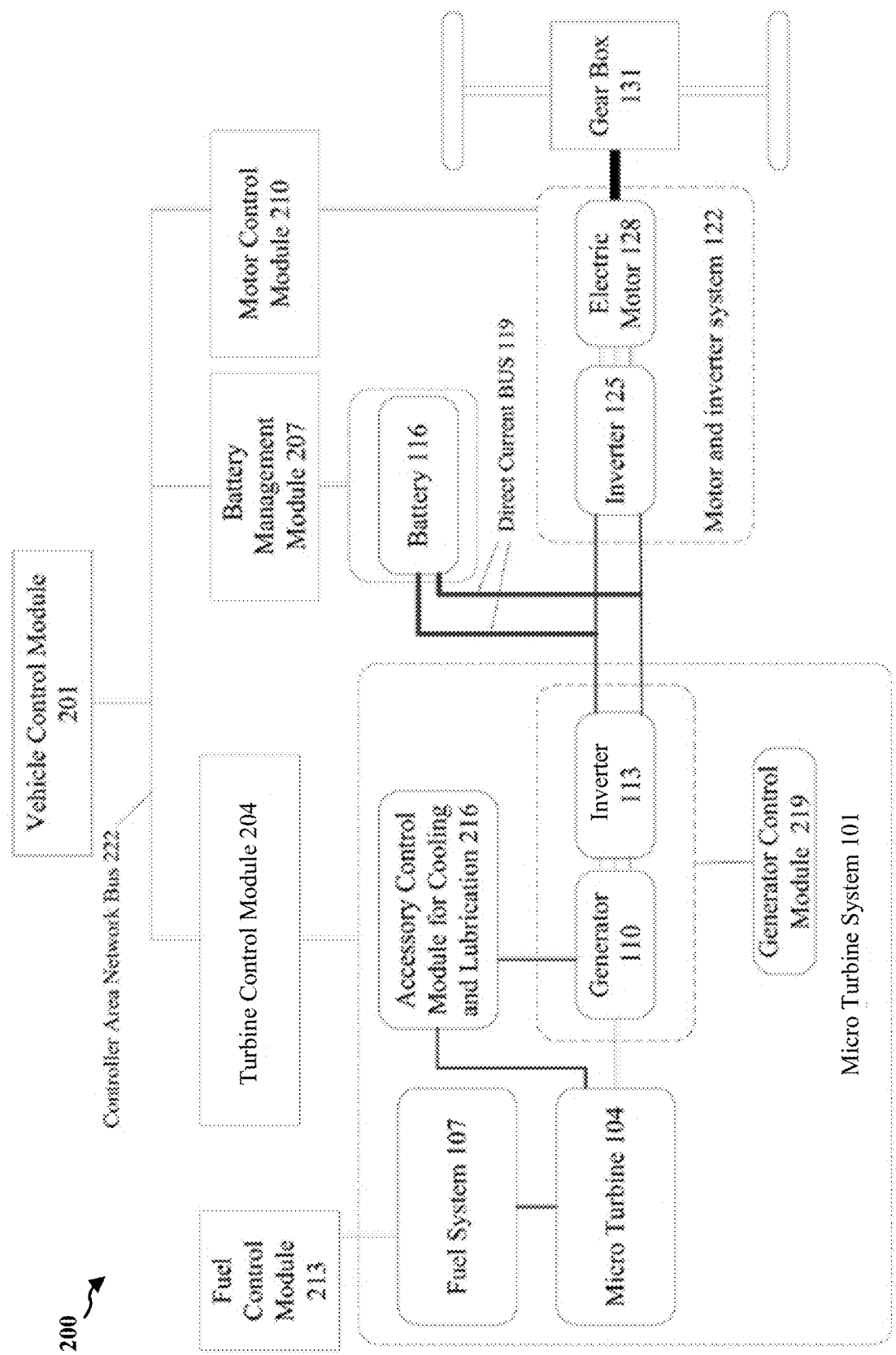
FIG. 2 is a schematic diagram 200 illustrating a vehicle control module of an EREV.

FIG. 2 is a schematic diagram 200 illustrating a vehicle control module of an EREV. Vehicle control module 201 includes an overall control board with software that controls and manages vehicle powertrain system including micro turbine 104, battery 116, electric motor 128 and overall operations of system 100. Specifically, vehicle control module 201 includes a turbine control module 204 for controlling micro turbine system 101, a battery management module 207 and a motor control module 210. In one configuration, a controller area network (CAN) bus 222 may be utilized to allow microcontrollers and devices to communicate with each other without a host computer.

Turbine control module 204 provides overall electronic control with software that controls and manages operations and communications of engine sub-components and micro turbine 104. Specifically, turbine control module 204 includes fuel control module 213 that controls fuel supply to micro turbine system 101, an accessory control module for cooling and lubrication 216 of generator 110 and micro turbine 104, and a generator control module 219 that controls operations of generator 110 and inverter 113.

Battery management module 207 is an electronic system that manages battery operation such as monitoring operating state, reporting operation data, controlling battery operation environment, balancing cell voltage and preventing battery 116 from operating outside battery safe operating region. Specifically, battery management module 207 controls operation and management of battery 116. In one configuration, when an operation such as acceleration is performed, electric motor 128 needs extra power to perform the acceleration and battery management module 207 may control battery 116 to supply the extra power to electric motor 128 through inverter 125. In another configuration, when there is extra power from micro turbine 104 or battery 116 needs to be recharged, battery management module may recharge battery 116 through DC bus 119.

Motor control module 210 is a power electronic system that controls operations of electric motor 128 including regulating and converting power from a DC to an AC power to control motor output power, torque and frequency (speed) based on driving input. Specifically, motor control module 210 controls operations of electric motor 128 and adjusts operation of inverter 125 accordingly.

Fuel control module 213 is an electronic control board that controls fuel delivery to micro turbine 104, which includes flow rate control, pressure control and flow distribution to an individual fuel injector through a fuel manifold.

Accessory control module for cooling and lubrication 216 is an electronic system that controls proper cooling to operate micro turbine system 101 within a safe temperature limit and sufficient lubrication to a bearing system to maintain a stable rotor dynamic system of micro turbine system 101.

Generator control module 219 is a power electronic system that converts a DC power to an AC power to drive generator 110, initiates micro turbine 104 and/or a compressor 304 during an engine startup process, and/or converts an AC to a DC power during normal turbine operation to generate electricity. In one configuration, generator 110 may be a permanent magnet generator 301.

FIG. 3 is a schematic diagram illustrating micro turbine system 101. Micro turbine system 101 includes compressor 304 connected to permanent magnet generator 301 and is driven by permanent magnet generator 301, a lean premix combustor 310, and micro turbine 104.

Permanent magnet generator 301 includes a permanent magnet rotor or sleeve and a permanent magnet stator. Any other suitable type of motor generator may also be used. The permanent magnet rotor or sleeve may contain a permanent magnet. The permanent magnet rotor or sleeve and the permanent magnet disposed therein are rotatably supported within the permanent magnet generator stator. Preferably, one or more compliant foil, fluid film, radial, or journal bearings rotatably support the permanent magnet rotor or sleeve and the permanent magnet disposed therein. All bearings, thrust, radial or journal bearings may be fluid film bearings or compliant foil bearings. Permanent magnet generator 301 includes a housing that encloses stator heat exchanger having a plurality of radially extending stator cooling fins.

During operations of system 100, intake air 307 flows in and is divided into two parts: one part is for permanent magnet generator 301 and the other part is for compressor 304. The one part of air for permanent magnet generator 301 flows into an annular space between the permanent magnet generator housing and the permanent magnet generator stator along a flow path. Heat is exchanged from stator cooling fins to the one part of cooling air from intake air 307, thereby cooling the stator cooling fins, the stator and the rotor, and forming heated air. The exhaust heated air from permanent magnet generator 301 is conducted away from intake air 307.

Compressor 304 compresses the second part of intake air 307 from a low pressure to a high pressure. The compressed intake air will be delivered to a recuperator 317. Compressor 304 may include compressor impellers and compressor impeller housing. The compressor impellers compress intake air 307 and force the compressed air of intake air 307 to flow into recuperator 317.

Recuperator 317 heats the compressed intake air and recovers heat of exhaust air 320 from micro turbine 104. Recuperator 317 may have an annular shape defined by cylindrical recuperator inner wall and cylindrical recuperator outer wall. Recuperator 317 includes a first set of passages connecting from compressor 304 to lean premix combustor 310 and a second set of passages connecting from exhaust air 320 to clean exhaust air 323. In the first set of passages of recuperator 317, heat is exchanged from walls of recuperator 317 to the compressed intake air 307. The heated and compressed air flows out of recuperator 317 and flows into lean premix combustor 310. Fuel (not shown) from fuel system 107 may react with the heated and compressed air in lean premix combustor 310, converting chemically stored energy to heat. Hot compressed gas mixture in lean premix combustor 310 then flows through micro turbine 104, forcing a wheel of micro turbine 104 to rotate.

Lean premix combustor 310 may comprise one or more fuel injector inlets to accommodate fuel injectors which receive fuel from fuel system 107 and inject fuel or a fuel air mixture to interior of lean premix combustor 310. Lean premix combustor 310 mixes fuel or gas from fuel system 107 through the one or more fuel injectors with the heated and compressed intake air from recuperator 317. The mixture of the heated and compressed intake air from recuperator 317 and the fuel or gas combusts in a chamber of lean premix combustor 310 and drives micro turbine 312 to operate in a high rotational speed. Mixing of the air and fuel may occur prior to entering or after entering the combustion chamber. A lean premixed combustor may operate in diffusion flame mode during operating conditions such as startup and shutdown, low or transient loads and cold ambient. Premixing prevents local "hot spots" within the combustor volume that can lead to significant NOx formation.

Micro turbine 104 is a small combustion turbine that is suitable to be placed in a personal vehicle. In certain configurations, micro turbine 104 may generate power outputs of 25 kW to 500 kW. Micro turbine 104 includes a turbine wheel. The hot and compressed mixture from lean premix combustor 310 flows through micro turbine 104 and forces the turbine wheel to rotate. Micro turbine 104 is designed so that exhaust gas flowing from lean premix combustor 310 through micro turbine 104 enters into a cylindrical passage and then moves in a direction to the second passage of recuperator 317. Micro turbine 104 and compressor 304 may be mechanically constrained by bolts, or other suitable technique, to rotate when the turbine wheel of micro turbine 104 rotates. Mechanical link mechanically constrains the compressor impellers of compressor 304 to the permanent magnet rotor or sleeve. The permanent magnet rotor or sleeve and the permanent magnet disposed therein rotate when compressor impeller of compressor 304 rotates.

An exhaust device releases the exhausted air from micro turbine 104 and recuperator 317. After exhaust air 320 passes through recuperator 317, exhaust air 320 becomes clean exhaust air 323.

Figure 4:
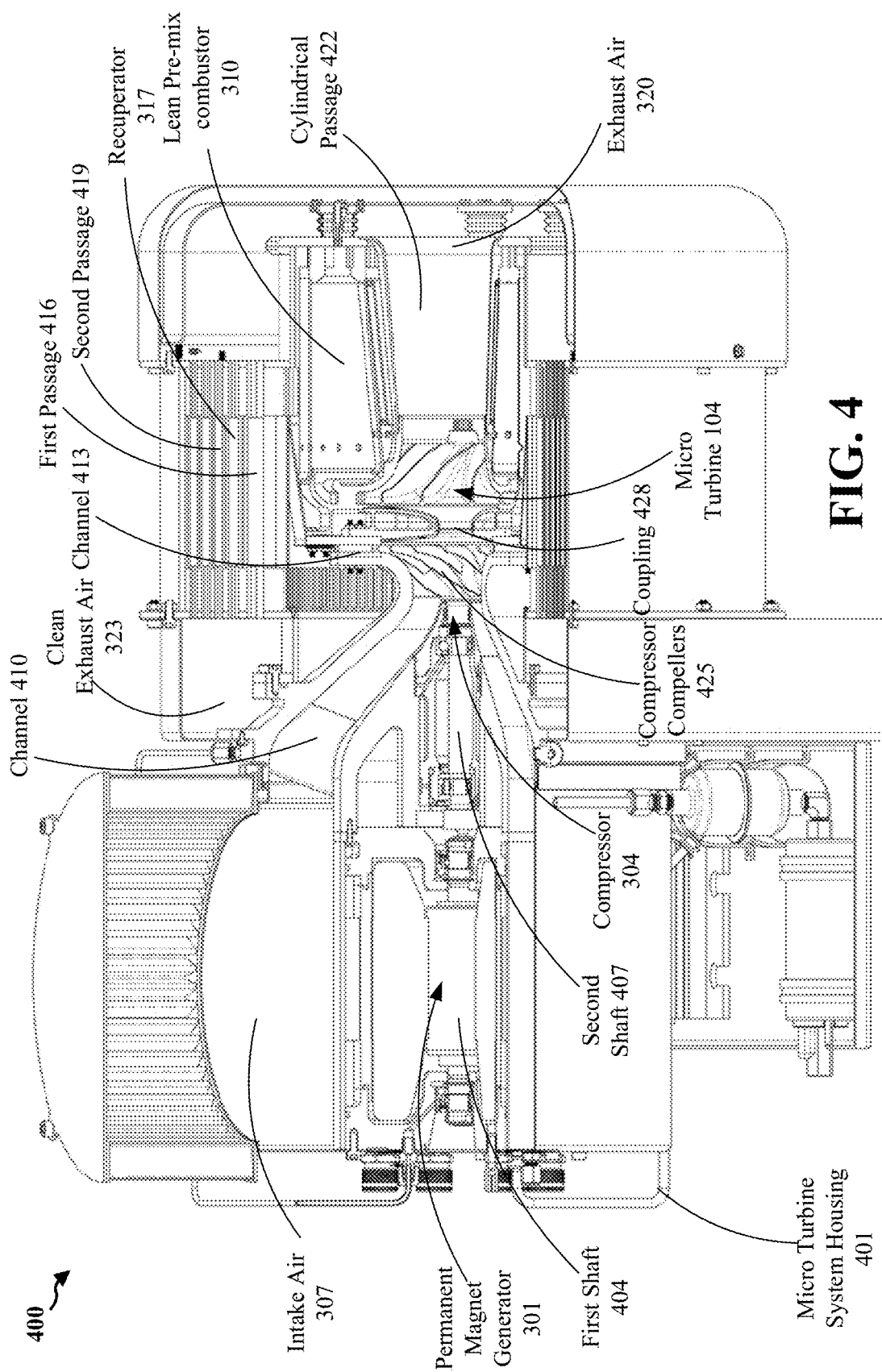
FIG. 4 is a sectional view of a micro turbine system.

FIG. 4 is a sectional view of a micro turbine system 101. Micro turbine system 101 has a housing 401. Intake air 307 flows in a space between inner wall of housing 401 and outer wall of permanent magnet generator 301, and enters into compressor 304 to be compressed through channel 410. Permanent magnet generator 301 has a first shaft 404 and a second shaft 407 mechanically coupled to first shaft 404. Compressor 304 is connected to the second shaft. Compressor 304 is mechanically coupled to micro turbine 104 through coupling 428. During startup of micro turbine system 101, permanent magnet generator 301 takes the DC power from battery 116 to rotate compressor 304 and micro turbine 104. Compressor compellers 431 of compressor 304 compress part of intake air 307. The compressed air flows to a first passage 416 through channel 413 and may be heated by recuperator 317. The heated air from recuperator 317 flows to a chamber of lean premix combustor 310. When the rotational speed of micro turbine 104 reaches a preset rotational speed, micro turbine 104 will ignite the fuel or gaseous supply from fuel system 107 to mix with heated air from recuperator 317 and the mixture starts the combustion process in lean premix combustor 310 to produce electricity. The combustion process converts chemical energy to kinetic energy through a gas expansion process to drive compellers 425 of micro turbine 104 and to rotate the wheel of micro turbine 104. Part of the kinetic energy drives compressor 304 and the remaining kinetic energy is converted to the electricity through permanent magnet generator 301. Exhaust air 320 flows to a cylindrical passage 422 and then flows to a second passage 419 of recuperator 317.

Figure 5:
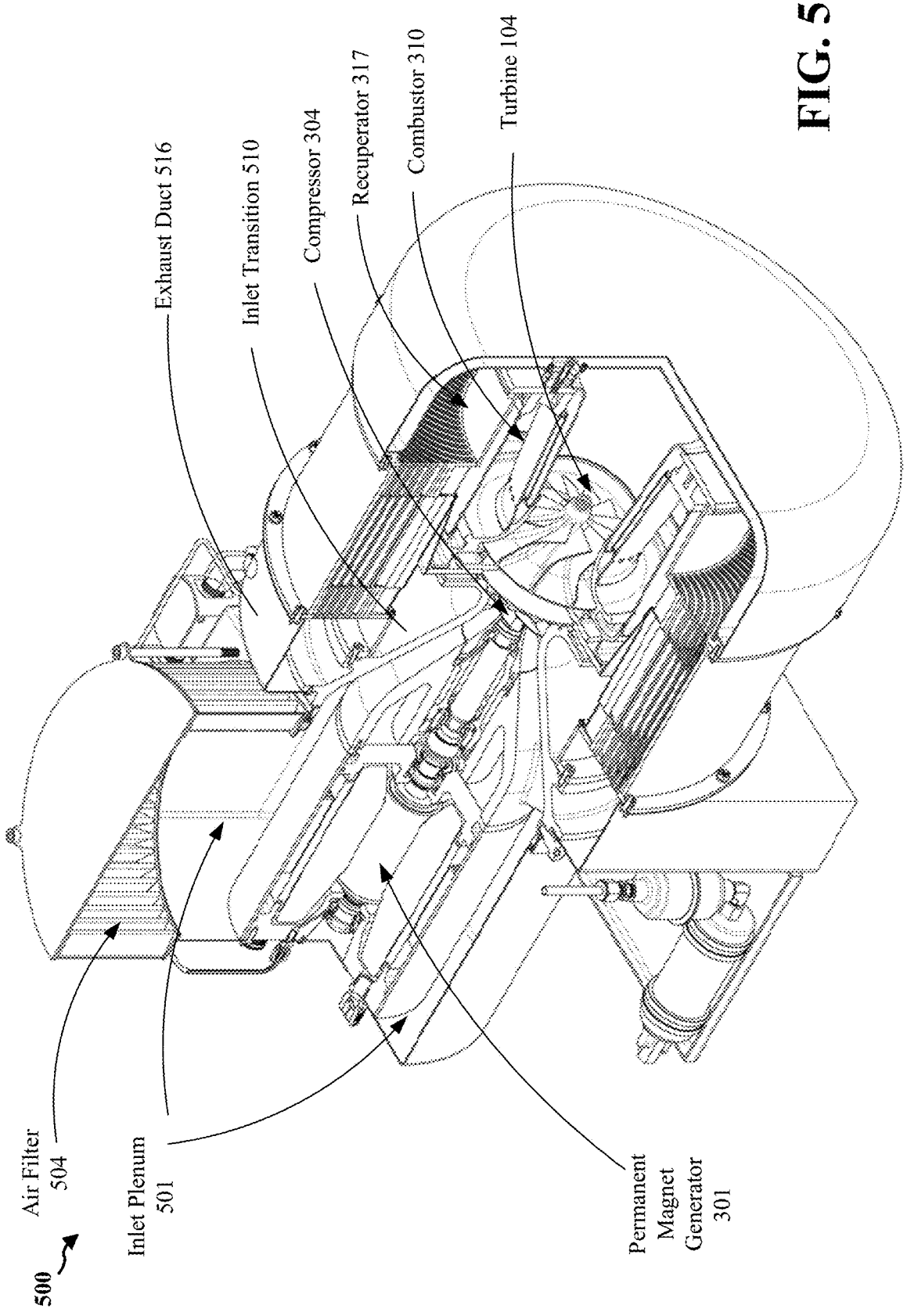
FIG. 5 is another sectional view of the micro turbine system.

FIG. 5 shows another sectional view of micro turbine system 101. Intake air 307 goes through an air filter 504 and forms an inlet plenum 501 around the outer wall of permanent magnet generator 301. Compressed air after compressor 304 enters an inlet transition region 510 before entering recuperator 317. Compressor 304, micro turbine 104 and permanent magnet generator 301 are mechanically coupled and rotate along a same axial axis. Exhaust air 320 from micro turbine 104 goes through recuperator 317 and enters an exhaust duct 507 before clean exhaust air 323 is released.

Figure 6:
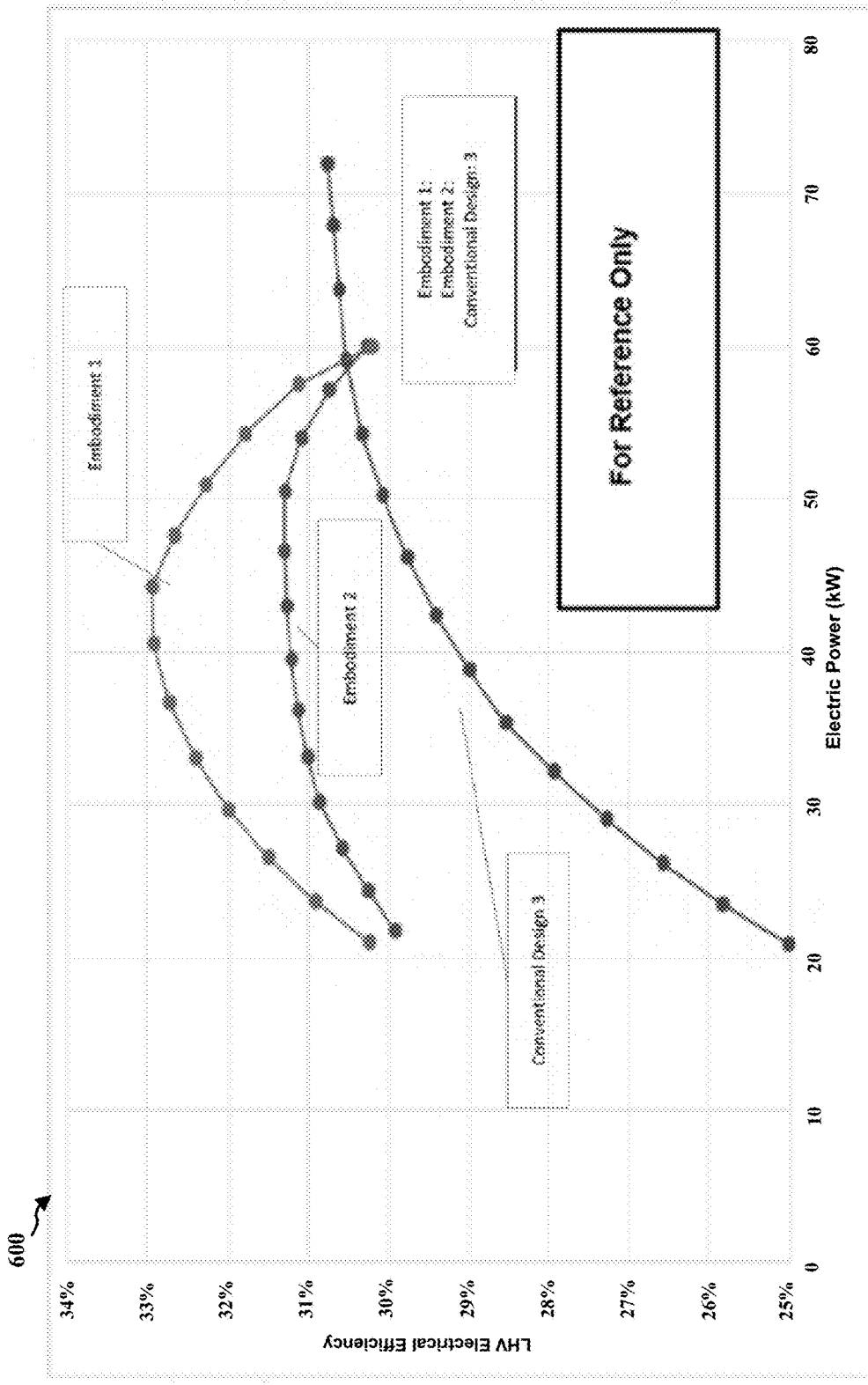
FIG. 6 shows a comparison of electrical efficiency of a conventional EREV not employing a micro turbine system and two exemplary EREVs employing the micro turbine system.

FIG. 6 shows a comparison of electrical efficiency of a conventional HEV not employing a micro turbine system and two exemplary HEVs employing the micro turbine system disclosed in the present disclosure. The two exemplary HEVs may have a lower heating value (LHV) electric efficiency from about 30 percent to about 33 percent when the electric power is from 20 kilowatts to 60 kilowatts, which is much higher than the efficiency of the conventional design.

Figure 7:
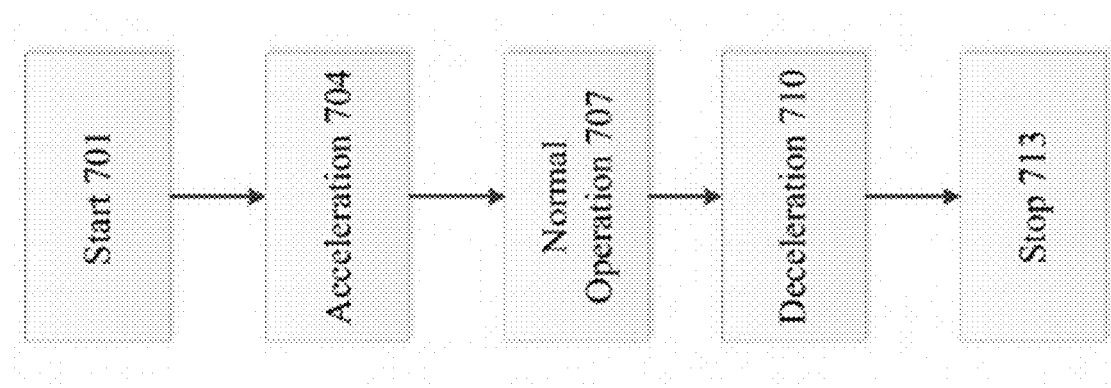
FIG. 7 is a flow chart illustrating operation procedures of an EREV.

FIG. 7 is a flow chart 700 illustrating operation procedures of an HEV. During start 701, a driver starts the HEV. Vehicle control module 201, including turbine control module 204, battery management module 207, motor control module 210, fuel control module 213, accessory control module for cooling and lubrication 216 and generator control model 219, checks the operation status of system 100 and its components. For example, battery management module 207 checks whether the HEV has a battery power higher than a predetermined power level. If the battery power is higher than the predetermined power level, the HEV will indicate an "OK" status for battery 116. Further, fuel control module 213 may check whether the HEV has an amount of fuel or gaseous supply in a fuel tank more than a predetermined level of fuel or gaseous supply. If the amount of fuel or gaseous supply in a fuel tank is more than the predetermined level of fuel or gaseous supply, fuel control module 213 may indicate an "OK" status for fuel or gaseous supply. Until vehicle control module 201 checks that the status of system 100 and its components is indicated as "OK" and the HEV is safe enough for driving, the HEV will start micro turbine system 101.

After startup of micro turbine system 101, for example, a speed sensor (not shown) detects the speed of the HEV. When the speed is lower than the speed required by the driver, vehicle control module 201 determines to start acceleration 704. Battery management module 207 determines that battery 116 provides a first power to rotate the rotator of permanent magnet generator 301, compressor 304 and micro turbine 104 and a second power to inverter 125, which is subsequently converted to an AC power to electric motor 128.

During acceleration 704, permanent magnet generator 301 takes the DC power from battery 116 to rotate compressor 304 and micro turbine 104. Specifically, battery 116 provides the first power to rotate the rotator of permanent magnet generator 301, compressor 304 and micro turbine 104. Further, battery 116 provides the second power to inverter 125 and electric motor 128. After the rotational speed of micro turbine 104 reaches the preset rotational speed, turbine control module 204 may determine that micro turbine 104 may ignite the fuel or gaseous supply from fuel system 107 to mix with the heated air from recuperator 317.

The combustion process drives compellers 425 of micro turbine 104 and rotates the wheel of micro turbine 104. Part of the kinetic energy drives compressor 304 and the remaining kinetic energy is converted to the electricity through permanent magnet generator 301. Specifically, the electricity generated from the rotation of micro turbine 104 provides power to electric motor 128 for driving gear box 131. Battery 116 may stop the power supply to electric motor 128. However, the HEV may still run at a speed lower than the operation speed required by the driver. The driver will press a gas panel to request more fuel or gas supply. Fuel system 107 may determine to supply more fuel or gaseous supply in accordance with the required speed of the driver. As such, more and more kinetic energy is converted to electricity through permanent magnet generator 301. The amount of electricity provided to electric motor 128, through inverter 113 and inverter 125, is increasing until the electricity provided to electric motor 128 is sufficient to drive gear box 131 at the speed required by the driver. In other words, acceleration 704 continues until the HEV reaches the speed required by the driver. In one configuration, during acceleration 704, battery 116 continues to supply the power to electric motor 128 until electric motor 128 drives gear box 131 at the speed required by the driver. In one configuration, vehicle control module 201 may draw as much electricity as possible from micro turbine 104 to satisfy the need of acceleration 704, while the remaining part of the "additional" electricity required for acceleration is provided by battery 116. Battery 116 is supplemental in natural. If all the additional electricity needed for acceleration can be supplied by micro turbine 104, then battery 116 does not need to provide any electricity to electric motor 128.

During normal operation 707, the HEV runs at the speed required by the driver. Battery 116 may provide no power to rotate micro turbine 104, generator 301 and compressor 304. All the power is provided from micro turbine 104 and generator 110. In one configuration, the electricity provided by micro turbine 104 is higher than the power required by electric motor 128, and the electricity may be used to charge battery 116 when needed. In one configuration, fuel system 107 may maintain a constant fuel or gaseous supply to the HEV so that micro turbine 104 may provide 100 percent power required by the HEV. In one configuration, fuel system 107 may supply an amount of fuel or gaseous supply lower than the constant fuel or gaseous supply to the HEV so that battery 116 may supply the secondary power to electric motor. In one configuration, inverter 125 may output the multi-phase AC power at a variety of voltages for electric motor 128. Power adjustment and power balance for the HEV between power sources of micro turbine 104 and battery 116 may be controlled by vehicle control module 201. However, during normal operation 707, micro turbine 104 and generator 110 will provide the primary power source for electric motor 127. Specifically, the primary power is more than 50 percent of the power required by the HEV for operating at the full speed required by the driver. The primary power may be any percent from more than 50 percent to 100 percent of the power required by the HEV for operating at the full speed required by the driver. Also, the primary power may be more than 90 percent, 95 percent, or even more than 99 percent of the power required by the HEV.

During deceleration 710, the driver may either press the brake of the HEV, or loosen the fuel or gaseous supply panel. Fuel system 107 may determine to supply less fuel or gaseous supply, therefore reducing the electricity provide to the electric motor 128 in accordance with the required speed of the driver. The power needed for operating the brake and the fuel or gaseous supply panel may be provided by battery 116. In one configuration, fuel system 107 may still maintain a same fuel or gaseous supply to the HEV for deceleration 710 as normal operation 707, but the extra power may be used to charge battery 116 when needed. After the rotational speed of micro turbine 104 is lower than the preset rotational speed, micro turbine 104 may not supply power for electric motor 128, and battery 116 starts to provide a power for electric motor 128.

During stop 713, the driver presses the brake and stops the HEV. Battery management module 207 determines that battery 116 provides the power for the brake system and other components for stop 713 of the HEV. Turbine control module 204 may determine that fuel system 107 provides no fuel supply.

From a first normal operation to a second normal operation of the HEV, acceleration or deceleration may be involved with to switch from the first normal operation to the second normal operation. However, acceleration or declaration between the first normal operation and the second normal operation may be different from acceleration 704 or deceleration 710. For example, in the first normal operation, micro turbine 104 has already been initiated and is operating at a certain rotational speed, while micro turbine 104 requires the power from battery 116 to start the rotation during acceleration 704, and in the second normal operation, micro turbine 104 may still run at a second rotational speed greater than a threshold but different from a first rotational speed while micro turbine 104 may approach to zero rotational speed during deceleration 710. Accordingly, from the first normal operation to the second normal operation of the HEV, the primary power for acceleration and/or deceleration may not be necessarily from battery 116, and micro turbine 104 may provide the primary power for switching between the first normal operation and the second normal operation of the HEV.

In one configuration, the size of battery 116 is smaller than that of a traditional HEV because battery 116 provides the secondary power and does not need to provide the primary power the HEV. Further, the requirements of charging and/or discharging battery 116 are not as strict as these of the traditional HEV. For example, it may take much longer time to charge and/or discharge battery 116 than the battery installed in the traditional HEV.

In one configuration, micro turbine system 101 has a rotating system that includes two independent rotor assemblies. One rotor assembly is a generator rotor assembly and the other is a powerhead rotor assembly. The two rotor assemblies are connected via a mechanical coupling that allows torque transmission between them without inducing rotor dynamic response and bearing loads. The powerhead rotor assemblies may have two configurations: 1) an overhung back-to-back compressor and a turbine wheel with two outboard bearing packs on a cold side of a core flow; and 2) a compressor and a turbine wheel outboard of internal bearing packs. The generator rotor assembly comprised of a permanent magnet and a shaft specially assembled to prevent the permanent magnet from disintegrating and/or fracturing at high rotating speed condition.

In one configuration, the generator stator has a water jacketed housing to prevent from overheating and to optimize performance over a wide range of vehicle operating conditions.

In one configuration, micro turbine system 101 includes a bearing cartridge for the generator rotor assembly and the powerhead rotor assembly. The bearing cartridge is designed to withstand high radial and thrust loads; capable of high cycle start and/or stop operations that are well suitable for vehicle applications; and includes a set of rolling element bearings and sleeves to set a rotor shaft for optimal rotor response and to provide damping when assembled in a housing.

In one configuration, the bearing housing includes a unique water jacked cooling system to prevent lubrication oil from coking and to prevent bearing from over-heating.

In one configuration, a special air intake device is designed to attenuate acoustic noise and minimize engine performance loss. Further, the system itself is designed to have a noise reduction unit that decreases overall noise levels for the system.

In one configuration, lean premix combustor 310 has an ignitor (not shown). Quick ignition capability for the ignitor is designed for minimizing startup pollution for high cycle operation. In another configuration, design and architecture of lean premixed injector provides an ultra-low emission combustion system for vehicle applications with fuel flexibility, operable over a wide operating range.

In one configuration, instrumentations such as emission sensors, dynamic pressure sensors, thermal couples, speed sensors, pressure transducers and proximity probes are employed to monitor combustion performance, stability and overall performance of micro turbine system 101.

In one configuration, the turbine efficiency is maximized and maintained by controlling turbine inlet temperature throughout the operating range from maximum to partial power conditions while monitoring with feedback signals from the instrumentations.

In one configuration, combustion performance such as emission and flame stability is controlled at its optimal operating region with the feedback signals from the instrumentations to meet the stringent regulatory requirements, even the most stringent regulatory requirements.

In one configuration, combustion system is able to accommodate more fuel types with large fuel composition variations using active control methods.

In one configuration, the HEV is a plug in electric vehicle with a battery and an on-board automotive micro turbine generator (AMT) to drive the electric motors.

In one configuration, the HEV is directly and solely driven by the electric traction motors.

In one configuration, the power sources of the HEV come from the battery and the micro turbine, each of which can power the electric motor directly. However, the micro turbine is the primary power source while the battery serves as the supplemental power source for vehicle transient operations such as acceleration, or energy storage when needed. Accordingly, a smaller capacity battery is required compared to a traditional HEV.

In one configuration, the system can be applied to different transportation tools such as a train, a ship, a truck, and so on. The present application is not limited to be applied to a hybrid electric vehicle.

The benefits of the present disclosure include, but are not limited to: a lower cost including a low initial cost and a low life cycle cost, and reduced weight which leads to higher vehicle efficiency.

The advantages of using the micro turbine as the primary power for the electric vehicle include, but are not limited to: fewer moving parts, compact in size, light weight, longer component life, potential for reuse, high thermal efficiency resulting in low fuel cost, potential to recover exhaust gas heat, ultra-low emissions, cleaner than grid & other combustion technologies, no expensive exhaust after treatment, capability of using multiple fuels including CNG, diesel, gasoline, hydrogen, no range anxiety and using existing fueling infrastructure.

Further, the range extended electric vehicle has the on board battery for energy storage and on board micro turbine or IC engine for power generation. The battery and micro turbine or IC engine operate as an integrated system to provide power to the grid. Certain implementations provide vehicle to grid power application via micro turbine or IC engine range extender technology with low emission. Certain implementations provide vehicle to vehicle grid network to support local high energy demand or during natural disaster. Certain implementations provide local power demand in off-grid and rural area without easy access to local utility. Certain implementations provide alternative clean power source based on local fuel availability due to system's fuel flexibility with micro turbine range extender.

The foregoing description of the exemplary configurations of the present disclosure has been presented only for the purposes of illustration and description and is not intended to be exhaustive or to limit the present disclosure to the precise forms disclosed. Many modifications and variations are possible in light of the above teaching.

The configurations are chosen and described in order to explain the principles of the present disclosure and their practical application so as to activate others skilled in the art to utilize the present disclosure and various configurations and with various modifications as are suited to the particular use contemplated. Alternative configurations will become apparent to those skilled in the art to which the present disclosure pertains without departing from its spirit and scope. Accordingly, the scope of the present disclosure is defined by the appended claims rather than the foregoing description and the exemplary configurations described therein.

What is claimed is:

1. A vehicle power system, comprising:
    an electric motor;
    a primary power source that energizes the electric motor, wherein the primary power source employs a turbine to generate electricity;
    a second power source that supplements the primary power source to energize the electric motor; and
    a control component that monitors power provided to the electric motor by the primary power source, that determines that additional power needs to be provided to the electric motor in order to meet a driving requirement, and that directs additional power from the second power source to the electric motor,
    wherein the primary power source comprises a permanent magnet generator, wherein the control component is configured to, during a startup of the primary power source, direct power from the second power source to the permanent magnet generator; and
    wherein the control component is further configured to:
    determine that the electric motor needs a first amount of power to meet the driving requirement;
    when the primary power source generates a second amount of power that is greater than the first amount, direct the first amount of power from the primary power source to the electric motor, and direct power from the primary power source other than the first amount to the second power source to charge the second power source;
    when the primary power source generates a second amount of power that is smaller than the first amount, direct the second amount of power from the primary power source to the electric motor, and direct power from the second power source to the electric motor such that the electric motor receives the first amount of power; or
    when a second amount of power generated by the primary power source when the turbine operates at a lowest preset rotational speed is greater than the first amount, energize the electric motor by power provided by the second power source without power provided by the primary power source.

2. The vehicle power system of claim 1, wherein the primary power source further comprises:
    a recuperator that is configured to
    absorb heat from exhaust air that is received from the turbine,
    heat intake air that is received from a compressor, and
    output the heated intake air to the turbine.

3. A method of operating a vehicle power system, comprising:
    monitoring power provided to an electric motor by a primary power source of the vehicle power system, wherein the primary power source energizes the electric motor, wherein the primary power source employs a turbine to generate electricity;
    determining that additional power needs to be provided to the electric motor in order to meet a driving requirement; and
    directing the additional power from a second power source to the electric motor, wherein the second power source that supplements the primary power source to energize the electric motor,
    wherein the primary power source further comprises a permanent magnet generator, wherein the method further comprises, during a startup of the primary power source, directing power from the second power source to the permanent magnet generator,
    wherein the method further comprises:
    determining that the electric motor needs a first amount of power to meet the driving requirement;
    when the primary power source generates a second amount of power that is greater than the first amount, directing the first amount of power from the primary power source to the electric motor, and directing power from the primary power source other than the first amount to the second power source to charge the second power source;
    when the primary power source generates a second amount of power that is smaller than the first amount, directing the second amount of power from the primary power source to the electric motor, and directing power from the second power source to the electric motor such that the electric motor receives the first amount of power; or
    when a second amount of power generated by the primary power source when the turbine operates at a lowest preset rotational speed is greater than the first amount, energizing the electric motor by power provided by the second power source without power provided by the primary power source.

4. The method of claim 3, wherein the primary power source further comprises a recuperator, wherein the method further comprises:
    absorbing, at the recuperator, heat from exhaust air that is received from the turbine,
    heating, at the recuperator, intake air that is received from a compressor, and output, from the recuperator, the heated intake air to the turbine.

5. A computer-readable medium storing computer executable code for operating a vehicle power system, comprising code to:
monitor power provided to an electric motor by a primary power source of the vehicle power system, wherein the primary power source energizes the electric motor, wherein the primary power source employs a turbine to generate electricity;
determine that additional power needs to be provided to the electric motor in order to meet a driving requirement; and
direct the additional power from a second power source to the electric motor, wherein the second power source that supplements the primary power source to energize the electric motor,
wherein the primary power source further comprises a permanent magnet generator, wherein the code is further configured to, during a startup of the primary power source, direct power from the second power source to the permanent magnet generator,
wherein the code is further configured to determine that the electric motor needs a first amount of power to meet the driving requirement;
when the primary power source generates a second amount of power that is greater than the first amount, direct the first amount of power from the primary power source to the electric motor, and direct power from the primary power source other than the first amount to the second power source to charge the second power source;
when the primary power source generates a second amount of power that is smaller than the first amount, direct the second amount of power from the primary power source to the electric motor, and direct power from the second power source to the electric motor such that the electric motor receives the first amount of power; or
when a second amount of power generated by the primary power source when the turbine operates at a lowest preset rotational speed is greater than the first amount, energize the electric motor by power provided by the second power source without power provided by the primary power source.

* * * * *